Jan. 18, 1955 P. LITTY 2,699,674
INSTRUMENT SERVING FOR DETERMINING AND RECORDING
THE VARIATIONS IN THE TENSILE STRENGTH
OF ROVINGS OF FIBROUS MATERIALS
Filed April 27, 1953
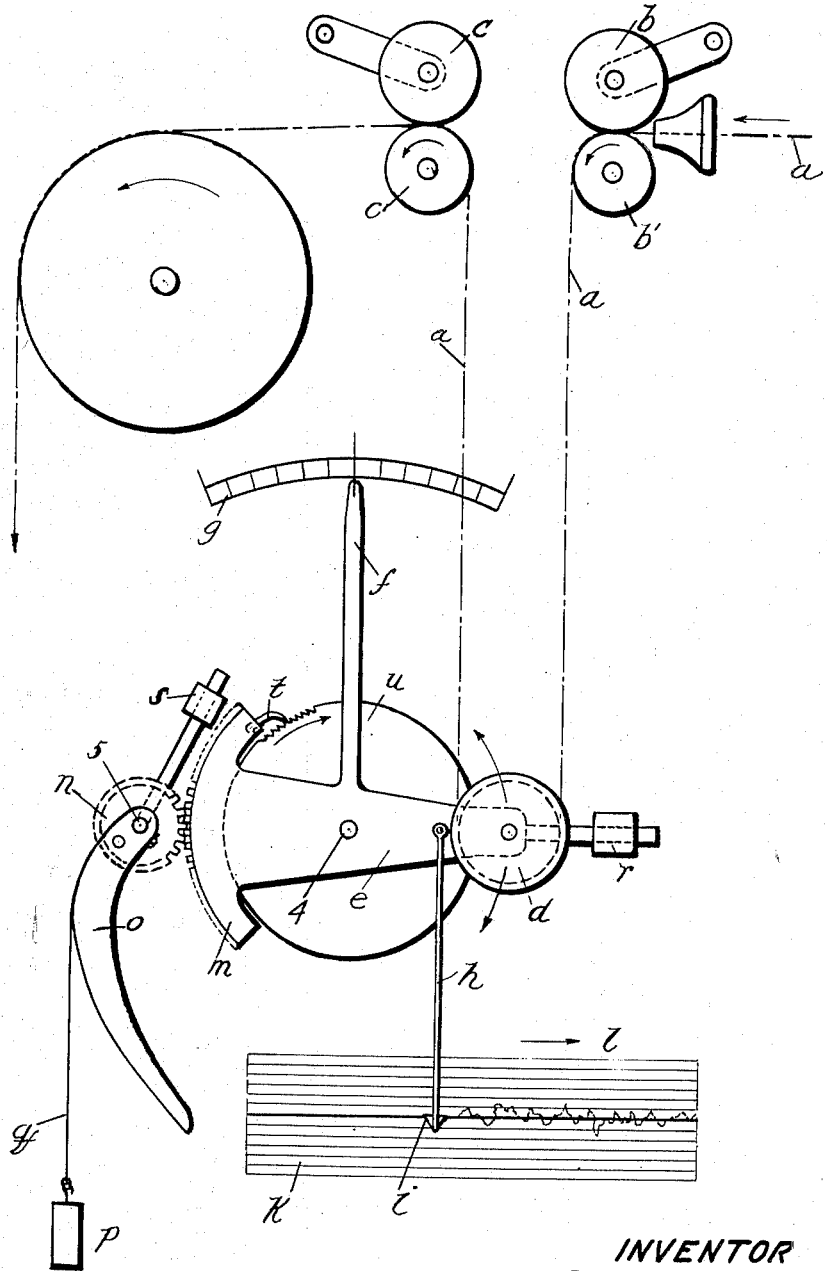
INVENTOR
PAUL LITTY
By Louis C. Smith
ATTORNEY United States Patent Office 2,699,674
Patented Jan. 18, 1955

2,699,674

INSTRUMENT SERVING FOR DETERMINING AND RECORDING THE VARIATIONS IN THE TENSILE STRENGTH OF ROVINGS OF FIBROUS MATERIALS

Paul Litty, Guebwiller, France

Application April 27, 1953, Serial No. 351,121

1 Claim. (Cl. 73—95)

By the tensile strength (resistance to drawing) of the rovings of fibrous materials is meant the resistance that a roving possesses under the effect of a traction stress exercised on it up to the instant where, under this stress, it disintegrates and where its limit of elasticity is exceeded. There exist already instruments for determining and recording this variation of resistance to drawing with the purpose of defining exactly the twist to be given to the rovings.

These instruments involve in principle two pairs of delivering rolls traversed by the roving, one of which pairs of rolls delivers the roving at a greater speed than the other pair so as to stretch the roving, which passes around a pulley mounted on one arm of a counterweighted pivotally mounted beam. The deviation of the beam from its normal horizontal position due to variations in the strength of the roving at different points along its length is indicated on a scale with the aid of a pointer connected to the beam or may be traced graphically on a moving band of paper with the aid of a stylograph. The oscillations show distinctly the irregularities of the roving being tested.

When the beam turns about its pivot the counterweight mounted thereon moves in an arc of a circle having the pivot of the beam as a center. As a result according to the length of the beam, the static moment generated by the weight undergoes continual variations. It diminishes as the amplitude of movement of the beam increases. Thus when the amplitude varies from 0° to 30°, the static moment will be greater in said zone than in the zone comprised between 30° and 60° or 60° and 90°, and the proportional variations registered by the pointer on the one hand and by the stylograph on the other, will not have any common measure applicable throughout all the above zones.

The present invention covers an improvement in such instruments by which a substantially constant static moment is applied to the beam throughout the possible zone of amplitude between 0° and 90°, this being accomplished by a special counterweighting arrangement for the beam. According to the invention, a compensating arm is employed that is pivoted to turn about an axis separate from that of the beam and which is connected to the beam to turn therewith, but in an opposite direction, said compensating arm having an eccentrically curved segment and having a counterweight secured thereto by a flexible cord which passes around said curve segment, the construction being such that as the compensating arm is turned by turning movement of the beam the static moment which the compensating arm applies to the beam increases to compensate for the decreasing static moment which is applied to the beam by the counterweighted arm thereof.

The drawing attached represents diagrammatically one embodiment of this arrangement.

The roving $a$ to be examined is carried by the two pairs of delivering rollers $b$, $b_1$ and $c$, $c_1$ so that the rollers $c$, $c_1$ have a higher output than that of rollers $b$, $b_1$. Between these two pairs of rollers the roving passes over a pulley $d$ mounted on one arm of the beam $e$ which is pivotally mounted at 4 and carries a pointer $f$ moving in front of the scale $g$. The beam $e$ is also combined with a graphic recorder comprised of a stem $h$ with a stylograph $i$ and a paper band $k$ moving in the direction $l$. The arm of the beam $e$ which carries the pulley also has an adjustable counterweight $r$ mounted thereon which tends to turn the beam clockwise. The other arm of beam $e$ has a toothed segment $m$ geared with toothed wheel $n$ mounted for turning movement about a pivot 5 and to which a curved compensating arm $o$ is rigidly secured. The compensating arm $o$ has a flexible connection $q$ secured thereto which passes around the curved portion of the arm $o$ and has a counterweight $p$ attached thereto. The curvature of the arm $o$ is eccentric with relation to the axis 5 thereof, and hence when the arm $o$ turns in a clockwise direction the lever arm for the weight $p$ increases.

In using the device the counterweight $r$ will be adjusted so that the beam will be held in horizontal position shown in the drawings by the normal strength of the roving passing around the pulley $d$. If at any time the beam is turned counterclockwise by variation in the strength of the roving passing around the pulley $d$, the effective static moment of the counterweight $r$ will be decreased. Such counterclockwise movement of the beam, however, turns the compensating arm in a clockwise direction and during such clockwise turning movement of the arm the static moment which it applies to the beam will increase. The curvature of the arm $o$ is such that any decrease in the static moment produced by the counterweight $r$ will be offset by the increase in the static moment applied to the beam $e$ by the weight $p$ and due to the clockwise turning movement of the arm $o$, and as a result the effective static moment which is applied to the beam $e$ will remain substantially constant. When the beam $e$ is in its normal horizontal position, the pointer $f$ registers with the zero graduation on the scale $g$, but if the beam turns about its center 4 due to variations in the strength or degree of twist of the roving $a$ the pointer will register such variations on said scale. The value of having a substantially constant static moment applied to the beam is that the reading on the scale $g$ caused by movement of the pointer $f$ will not be affected by any change in the static moment applied to the beam by the counterweight $r$ as would be the case if the compensating arm $o$ was not used.

The gear $n$ has rigid therewith an arm 6 carrying an adjustable counterweight $s$, which in connection with the counterweight $r$ serves to balance the system.

The toothed segment $m$ of the beam $e$ has a pawl $t$ pivoted thereto which engages ratchet teeth formed on the ratchet member $u$. The purpose of this construction is to prevent any breakage of the roving in case a portion of the roving having a much reduced strength moves into the stretch of roving passing around the pulley $d$. The presence of such section of roving of reduced strength would normally allow the weighted arm of the beam to swing down suddenly, but the member $u$ applies a retarding force to such movement which prevents the breakage of the roving.

I claim:

An apparatus for determining and recording the variations in resistance to drawing of rovings of fibrous material which comprises two pairs of feed rolls for feeding forward the roving to be tested, a horizontal extending beam pivotally mounted intermediate its ends, thereby to provide two arm portions, said beam having a pulley on one arm portion around and beneath which a stretch of roving between the two pairs of feed rolls passes, a counterweight adjustable on said one arm portion, a pivotally mounted compensating arm, gearing connecting said compensating arm with the other arm of the beam by which turning movement of the beam about its pivot resulting from the variations in the strength of the portion of the roving passing around the pulley gives said compensating arm a corresponding turning movement but in an opposite direction, said compensating arm having an eccentrically curved portion, a flexible cord connected to said compensating arm and passing around the curved portion thereof and a counterweight suspended from the free end of said cord whereby when the static moment of the weighted arm of the beam decreases due to said arm swinging upwardly, the static moment which the compensating arm applies to the beam will increase correspondingly and the beam will be subjected to a substantially constant static moment during its swinging movement.

References Cited in the file of this patent

UNITED STATES PATENTS

| | | |
|---|---|---|
| 1,827,848 | Joksch | Oct. 20, 1931 |
| 1,961,755 | Foster | June 5, 1934 |
| 2,092,439 | Bouhuys | Sept. 7, 1937 |

FOREIGN PATENTS

| | | |
|---|---|---|
| 535,023 | Germany | Oct. 6, 1931 |
| 677,391 | Great Britain | Aug. 13, 1952 |